United States Patent
Calabrese et al.

(12) United States Patent (10) Patent No.: US 6,389,279 B1
(45) Date of Patent: May 14, 2002

(54) METHOD AND APPARATUS PROVIDING CALL REDIRECTION FOR SUBSEQUENT CALL EVENTS IN A TELEPHONE COMMUNICATIONS SYSTEM

(75) Inventors: Robert Thomas Calabrese, Naperville; Robin Jeffrey Thompson, Batavia; Jeffrey Arthur Zahnle, Elburn; Robert John Zurawski, Wheaton, all of IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/440,872

(22) Filed: Nov. 16, 1999

(51) Int. Cl.7 .................................................. H04Q 7/20
(52) U.S. Cl. ........................ 455/417; 455/413; 455/445
(58) Field of Search ................................. 455/412, 413, 455/414, 415, 417, 422, 445, 458, 550

(56) References Cited

U.S. PATENT DOCUMENTS 6,148,193 A * 11/2000 Miska et al. ................. 455/417
6,208,854 B1 * 3/2001 Roberts et al. ............. 455/417

* cited by examiner

*Primary Examiner*—Thanh Cong Le
(74) *Attorney, Agent, or Firm*—Michael B. Johannesen (57) ABSTRACT

An apparatus and method in a telephone communications system that provide for redirecting a call by an adjunct processor, utilizing a control message. The control message contains various directives for current or subsequent execution by a telephone switching center, which can assume a function of a mobile switching center in a wireless communications system or a landline switching center in a landline telephone system. Directives in the control message instruct the telephone switching center to redirect a call contingent upon subsequent call events that can occur.

19 Claims, 6 Drawing Sheets

250
| BILL ID | ~251 |
| DIGITS (DESTINATION) | ~252 |
| ELECTRONIC SERIAL NUMBER | ~253 |
| MOBILE IDENTIFICATION NUMBER | ~254 |
| OTHER PARAMETERS | ~255 |
| CallBackBusy | ~256 |
| CallBackNoAns | ~257 |
| CallBackFERel | ~258 |
| CallBackMobRel | ~259 |
| CallBackDefault | ~260 |

METHOD AND APPARATUS PROVIDING CALL REDIRECTION FOR SUBSEQUENT CALL EVENTS IN A TELEPHONE COMMUNICATIONS SYSTEM

FIELD OF INVENTION

This invention relates to a telephone communications system enabling call redirection for subsequent call events.

BACKGROUND OF THE INVENTION

With telephone communications systems, services may require call redirection to an alternate call destination dependent upon events that occur during the duration of the call. With the current state of the art, the initiation of the call redirection is caused by a call event that has already occurred. The prior art supports call redirection in one of three ways. The most common approach is to "camp on" the call by "hairpinning" the call through an adjunct processor using telephone facilities. This enables the adjunct processor to monitor the call throughout the duration of the call. However, hairpinning can add substantial cost to the service because additional transmission facilities are required. If a specified call event is detected by the adjunct processor, the adjunct processor instructs the telephone switching center to establish another call to a specified call destination.

With the second approach, hairpinning is not utilized. Rather, a call between a telephone unit and an adjunct processor is established. From the dialog that occurs during the call, the adjunct processor determines that the call should be redirected to another telephone designation. A connection is established from the telephone unit and the telephone designation. At this time, the adjunct processor is not involved with the call and thus is not active in subsequent call processing.

With the third approach, a call between a telephone unit and an adjunct processor is established, enabling dialog between the adjunct processor and the telephone unit to occur. The call is consequently redirected to another telephone designation. Moreover, the adjunct processor sends an enabling trigger to the telephone switching center over a control link. If the specified call event occurs, the telephone switching center sends a query message over the control link to the adjunct processor, asking for the appropriate action to be taken. The adjunct processor responds with a redirection message that contains a specified call destination.

Figure 1:
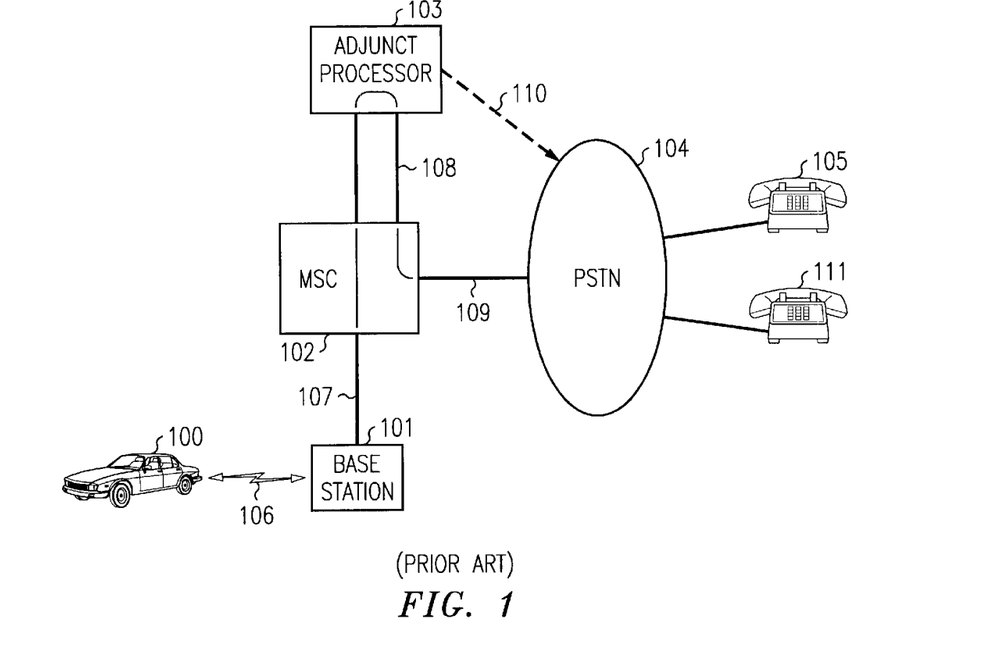
FIG. 1 illustrates a wireless communications architecture using an hairpinning configuration in accordance with prior art.

FIG. 1 corresponds to the hairpinning approach (the above-described first approach) and illustrates an architecture as embodied in prior art for attaching adjunct processor 103 to mobile switching center (MSC) 102 in order to provide wireless services. In this architecture, mobile subscriber unit 100 is provided services by MSC 102 through base station 101. Mobile subscriber unit 100 communicates with base station 101 over radio channel 106 requesting a call. Both control messages as well as voice transmission are supported by radio channel 106. Voice transmission is supported over facility 107 to a switching fabric contained in MSC 102. Adjunct processor 103 monitors and relays voice transmission to public switching telephone network (PSTN) 104 over facility 108 to facility 109. PSTN 104 establishes a voice connection to designated party 105 according to dialed digits entered by either mobile subscriber unit 100 or designated party 105 thus completing the call.

Adjunct processor 103 can reside at one of a number of network entities that are associated with a wireless intelligent network, including an intelligent peripheral (IP), a service node (SN), or a service control point (SCP). The IP performs specialized resource functions such as playing announcements, collecting digits, performing speech-to-text or text-to-speech conversions, recording and storing voice messages, and so forth. The SCP is a real-time database and transaction processing system that provides service control and service data functionality. The SN combines the capabilities of an IP and an SCP.

If adjunct processor 103 detects that a particular call event occurs during the call between mobile subscriber unit 100 and party 105, such as a disconnect indication from party 105, adjunct processor 103 issues control redirection message 110 to PSTN 104 to reconfigure a voice path between mobile subscriber unit 100 and party 111. Redirection message 110 is typically transported on a separate control link. PSTN 104 subsequently establishes a voice path through PSTN 104 to party 111.

Figure 2:
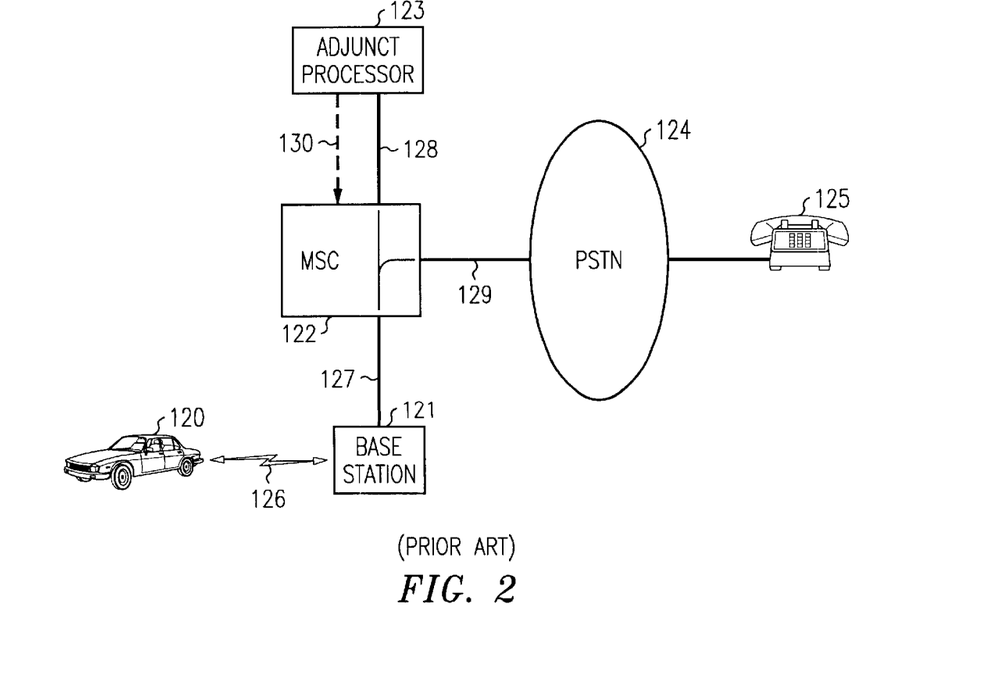
FIG. 2 illustrates a wireless communications architecture utilizing a redirection directive in accordance with prior art.

FIG. 2 corresponds to the above described second approach and illustrates a wireless communications architecture utilizing a redirection directive in accordance with prior art. Mobile subscriber unit 120 communicates with base station 121 over radio channel 126 requesting a call. Voice transmission is supported over facilities 127 and 128 to adjunct processor 123 through MSC 122. Consequently, a full-duplex connection is established between a user of mobile subscriber unit 120 and adjunct processor 123, from which it is determined that the call should be redirected to telephone unit 125. Adjunct processor 123 sends redirection message 130 to MSC 122, instructing MSC 122 to establish voice connection 129 through PSTN 124 to party 125 and to remove voice connection 128. Thus, a voice path is completed between mobile subscriber unit 120 and party 125. At this time, adjunct processor 123 is no longer active with the call.

Figure 3:
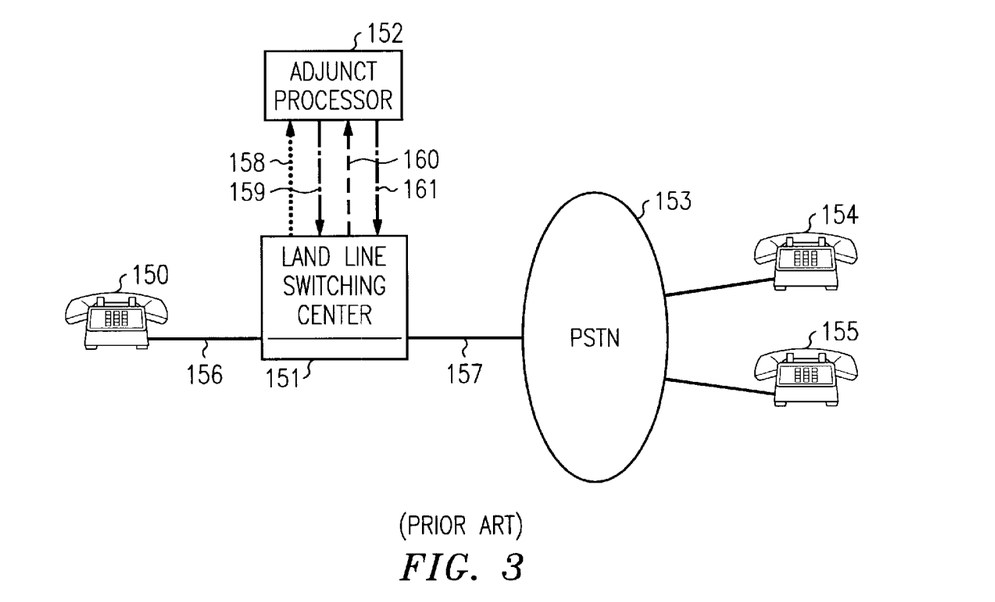
FIG. 3 illustrates a wireline telephone architecture in which the two-stage approach for control messaging is utilized in accordance with prior art.

FIG. 3 corresponds to the above described third approach and illustrates an architecture using a two-stage approach as embodied in prior art for attaching adjunct processor 152 to landline switching center 151 in order to provide landline telephone services. With landline advanced intelligent networks, landline switching center 151 is typically identified as a service switching point SSP. In this architecture, telephone unit 150 is provided service by telephone switching center 151. However, as appreciated by one skilled in the art, this architecture is applicable to wireless services by incorporating a plurality of base stations, replacing landline switching center 151 with a mobile switching center, and utilizing mobile subscriber units as telephone units. Moreover, the term "telephone unit" is applicable to a variety of telephone instruments including wired telephone sets, cordless telephones, mobile subscriber units, fixed wireless telephone sets and so forth.

In FIG. 3, telephone unit 150 communicates with landline switching center 151, requesting a call. This request is physically conveyed by a signal, which can be a digital message, on facility 156. Moreover, facility 156 also transports voice transmission once the call is established. Landline switching center 151 completes the call to party 154 over facility 157 through PSTN 153. Adjunct processor 152 is notified of the call by landline switching.center 151 by sending message 158 to adjunct processor 152. Messages 158, 159, 160, and 161 are transported on a control link between landline switching center 151 and adjunct processor 152.

Adjunct processor 152 arms landline switching center 151 in order to prepare landline switching center 151 for the possibility of a subsequent call event identified in arm event message 159. For advanced intelligent networks, arm event message 159 is specified as the Request_Report_BCM_Event message in Bellcore GR-1298-CORE and GR-1299-CORE, Issue 4, Revision 1, October 1998, pages 4–1 to 4–15 (SSP Processing of Triggers and Requested Events). Landline switching center 151 continues to process and monitor the call until the call event as specified in arm event message 159 occurs. If the call event occurs, landline switching center 151 stops processing, sends event query message 160 to adjunct processor 152, and waits for response message 161 from adjunct processor 152. GR-1298 and GR-1299 specify the event query message as the EDP-Request message for advanced intelligent networks. Adjunct processor 152 returns response message 161, which instructs landline switching center 151 about subsequent action, such as redirecting the call to a different party.

The present invention obviates the need for the adjunct processor to monitor the call or the need for a two-stage approach (the above described third approach) for redirecting the call while affecting a call contingent upon subsequent call events.

SUMMARY OF THE INVENTION

The apparatus and method of the present invention enables a telephone communications system to redirect a call by an adjunct processor, utilizing a control message having various directives for current and subsequent execution by a telephone switching center. The telephone communications system can function as a mobile switching center in a wireless communications system or a landline switching center in a landline telephone system. The adjunct processor may be implemented within a service control point, a service node, or an intelligent peripheral.

The adjunct processor includes program instructions to generate a control message in response to a request for telephone service, such as in response to a dialog between a user of a telephone unit and the adjunct processor. The telephone switching center includes program instructions to receive the control message, to redirect the call, and to redirect the call again in response to call events that may occur during the call when first redirected.

The control message contains a initial redirection telephone number associated with the first redirection and with designated telephone numbers associated with subsequent call events that can occur during the call after the call is redirected to the initial redirection telephone number. Alternatively, the control message may contain only designated telephone numbers associated with subsequent call events that can occur during the call in which the telephone unit is currently active.

Numerous other advantages and features of the present invention will become readily apparent from the detailed description of the invention and the embodiments thereof, from the claims, and from the accompanying drawings.

DETAILED DESCRIPTION

Figure 4:
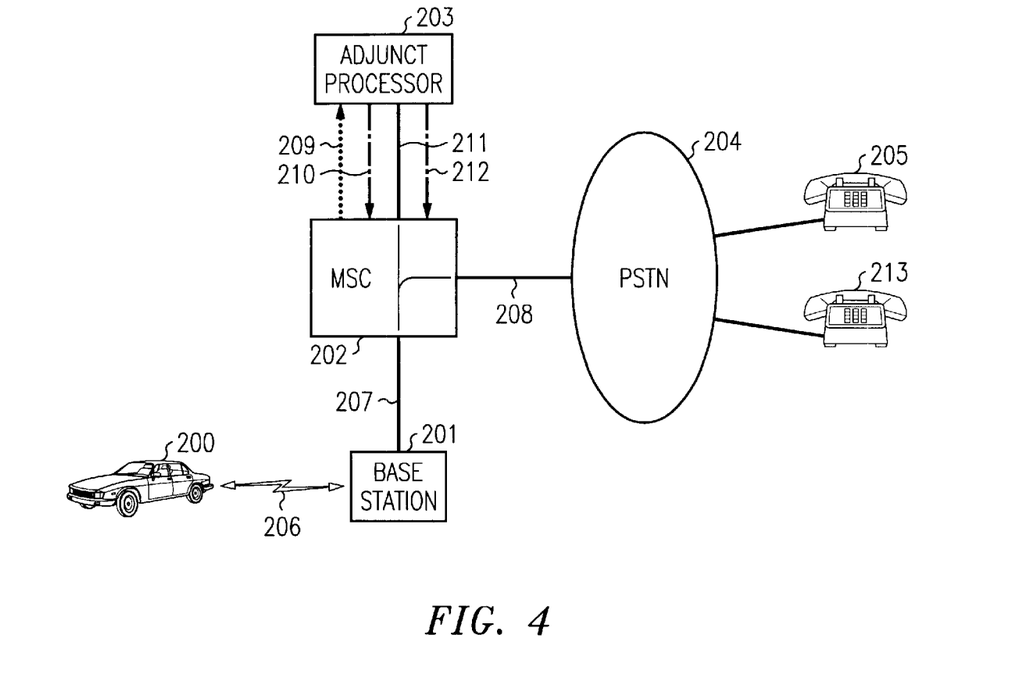
FIG. 4 illustrates an architecture for a single-stage redirection approach for a wireless communications system.

FIG. 4 illustrates an architecture in accordance with the present invention. In this architecture, only one redirection message is utilized. Thus, this architecture is referred to as a "single-stage" redirection approach. As in FIGS. 1 and 2, mobile subscriber unit 200 establishes a connection with base station 201 over radio channel 206 in order to support a call request. The connection is extended to MSC 202 over facility 207. Adjunct processor 203 is notified by MSC 202 sending, for example, an ORREQ message 209 to adjunct processor 203. Adjunct processor 203 acknowledges ORREQ message 209 by returning orreq message 210 to MSC 202. In this exemplary embodiment, a call is established between adjunct 203 and mobile subscriber unit 200 over facilities 207 and 211 so that a dialog occurs between adjunct processor 203 and a user of mobile subscriber unit 200.

Figure 5:
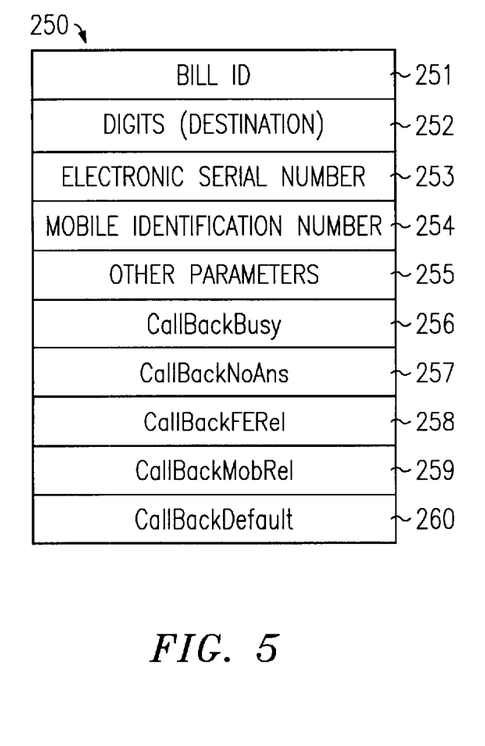
FIG. 5 illustrates a message structure for a modified ANSI-41 Redirection Directive message.

From this dialog, adjunct processor 203 determines that the call should be redirected and thus sends redirection message 212 to MSC 202. With the inclusion of a initial redirection telephone number, redirection message 212 instructs MSC 202 to reconfigure the call to party 205 over facility 208 through PSTN 204 and to remove facility 211, thus completing the call. Contingent upon the occurrence of a future call event during the call between mobile subscriber 200 and party 205, the call is redirected to party 213. Redirection message 212 contains the initial redirection telephone number of party 205, the designated telephone number of party 213, and the call event associated with the designated telephone number of party 213. (The structure of redirection message 212 is illustrated in FIG. 5 and is discussed subsequently.) Party 213 may correspond to another mobile subscriber unit, wireline telephone, or processor such as adjunct processor 203.

Other embodiments include call scenarios in which there is no dialog between adjunct processor 203 and mobile subscriber unit 200. In such cases, adjunct processor 203 is notified of the call at some time during the middle of the call. Thus, redirection message 212 may not contain an initial redirection telephone number but only at least one designated telephone number.

While FIG. 4 depicts an architecture of a wireless system, messages 209, 210 and 212 are also applicable to a landline telephone system. In such an arrangement, MSC 202 is analogous with a landline switching center (similar to that shown as landline switching center 151 in FIG. 2), mobile subscriber unit 200 is replaced with a telephone unit (similar to that shown as telephone unit 150 in FIG. 2), and base station 201 is removed, whereby the telephone unit directly communicates with the landline switching center over a facility.

FIG. 5 illustrates an exemplary embodiment of a message structure corresponding to redirection message 212 in accordance with ANSI-41 message REDDIR 250. ANSI-41 is specified in Telecommunications Industry Association/ Electronic Industries Association TLA/EIA SP-3588 Cellular Radio Telecommunications Intersystem Operations. The first parameter of REDDIR 250 is BillID parameter 251, which currently exists in ANSI-41 and is not relevant to the present invention. Digits parameter 252, which is an existing parameter in ANSI-41, corresponds to the initial redirection telephone number of party 205. Electronic Serial Number parameter 253 and Mobile Identification Number parameter 254 identifies the mobile subscriber unit associated with the call. Other parameters 255 is currently supported parameters in ANSI-41 that are not relevant to the present invention and is shown to illustrate the message structure of message REDDIR 250. Additional parameters CallBackBusy 256, CallBackNoAns 257, CallBackFERel 258, CallBackMobRel 259, and CallBackDefault 260 are included in REDDIR message 250 in order to support the single-stage redirection in accordance with the present invention. With this exemplary embodiment, the occurrence of future call events busy, no answer, far-end release, and mobile release correspond to parameters call back busy 256, call back no answer 257, call back far-end release 258, and call back mobile release 259, respectively. Each of these parameters contains a designated telephone number corresponding to a specified call event that may occur subsequently to generating REDDIR message 250. If any of parameters 256, 257, 258, or 259 does not contain a designated telephone number, the designated telephone number in CallBackDefault parameter 260 is used for the corresponding call event.

The functionality of parameters 254, 255, 256, 257, and 258 can be added to other standardized messages utilized in wireless services. One example is the CallControlDirective message as specified in Telecommunications Industry Association/Electronics Industries Association TIA/EIA PN-4287 (Wireless Intelligent Network Capabilities for Pre-Paid Charging). This example, as well as other examples that may be developed in the future, can be appreciated by one skilled in the art.

Figure 6:
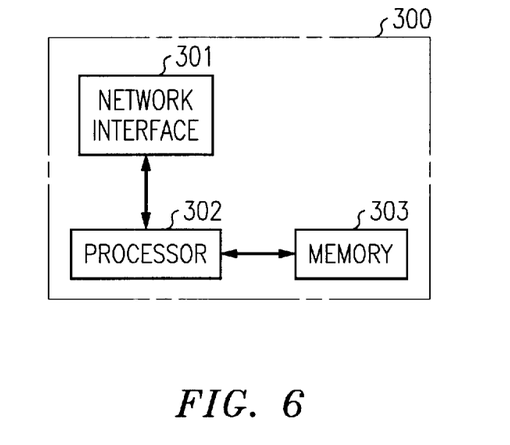
FIG. 6 is a block diagram of a telephone network illustrating an exemplary embodiment of the present invention.

FIG. 6 is a block diagram illustrating an apparatus embodiment 300 in accordance with the present invention. Apparatus 300 may be distributed between MSC 202 and adjunct processor 203. The functionality of adjunct 203 may reside on an intelligent peripheral, a service node, or a service control point.

Referring to FIG. 6, apparatus 300 includes processor 302, network interface 301, and memory 303. Network interface 301 detects specified call events, receives incoming calls, and initiates outgoing calls, generates control messages, and receives control messages. Network interface 301 may be couplable to PSTN 204 for transmission and reception of PSTN (wireline) calls or couplable to transmission and reception of wireless calls at base station 201. Memory 303 may be a magnetic hard drive, an optical storage device, or any other type of data storage apparatus and is used to store program instructions. In addition, memory 303 may also store information pertaining to types of services and subscriber classes, call placement, and routing information. Processor 302 may include a single integrated circuit or may include a plurality or integrated circuits or components connected, arranged, or grouped together. As used herein, the term "processor" should be understood to equivalently mean and include a single processor, an arrangement of processors, microprocessors, controllers, or some other grouping of integrated circuits which perform functions as will be discussed in relation to FIG. 7. Memory 303 contains the corresponding program instructions that perform the functions as shown in FIG. 7.

Figure 7:
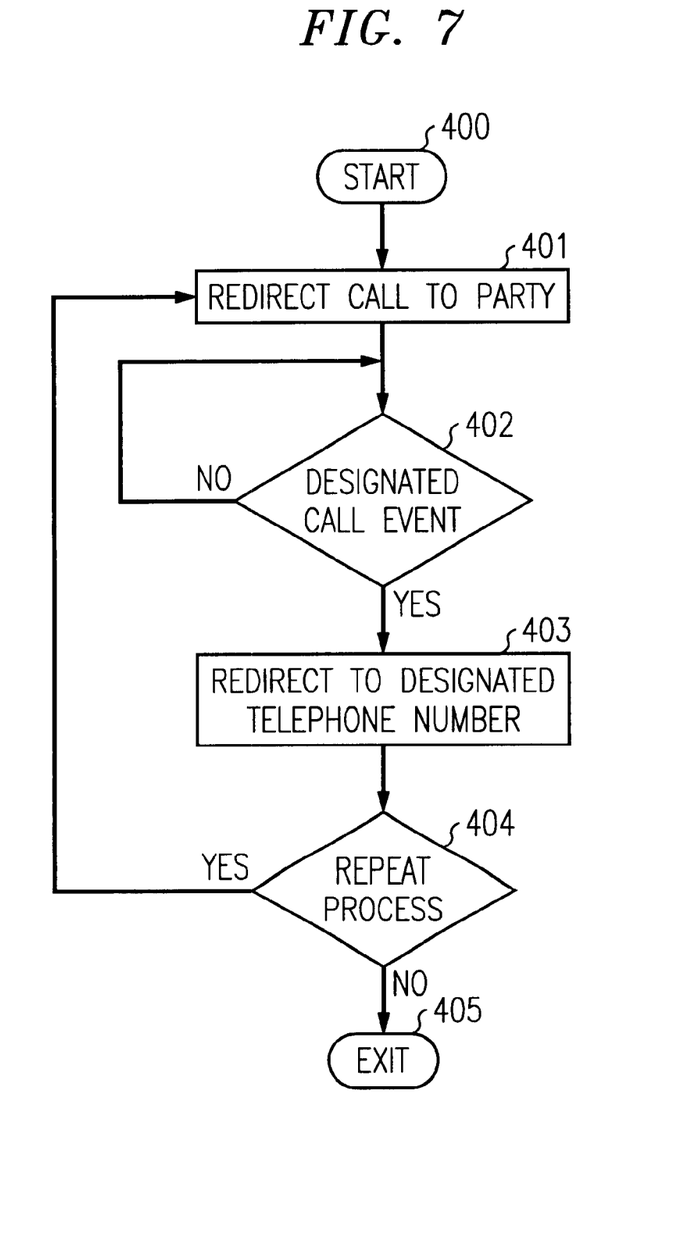
FIG. 7 is a flow diagram illustrating the logic for the single-stage redirection approach.

FIG. 7 is a flow diagram illustrating the logic for the single-stage redirection approach which may be represented in programming instructions, stored in memory 303, and executed by processor 302. Step 400 starts the process shown in FIG. 7 and is initiated by a call from the mobile subscriber unit to the adjunct processor. In step 401, based upon the dialog with the user of the mobile subscriber unit, the adjunct processor redirects the call to a party that previously called the mobile subscriber unit and left a message. The dialog and the message may assume a variety of formats and are not limited to voice, text, or dual tone multi-frequency (DTMF) characters.

The redirection message from the adjunct processor to the telephone switching center provides the initial redirection telephone number of the party as well as designated telephone numbers to which the call should be redirected a second time if specified call events subsequently occur during the redirected call between the mobile subscriber unit and the party. With this exemplary embodiment in step 402, the telephone switching center monitors for the specified call events during the directed call. In step 403, the call is redirected to appropriate designated telephone number corresponding to the call event that occurs first. In step 404, the adjunct processor determines if the process as shown in FIG. 7 should be repeated. If so, step 401 is repeated; otherwise, the process is exited in step 405. As an example, there may be additional messages for the telephone unit. In step 404, according to an exemplary embodiment, the designated telephone number of step 403 corresponds to the adjunct processor. However, other embodiments do not require that the call be redirected back to the adjunct processor but rather redirected to another designated telephone number. In such an embodiment, step 404 is not implemented; rather the process is exited.

Figure 8:
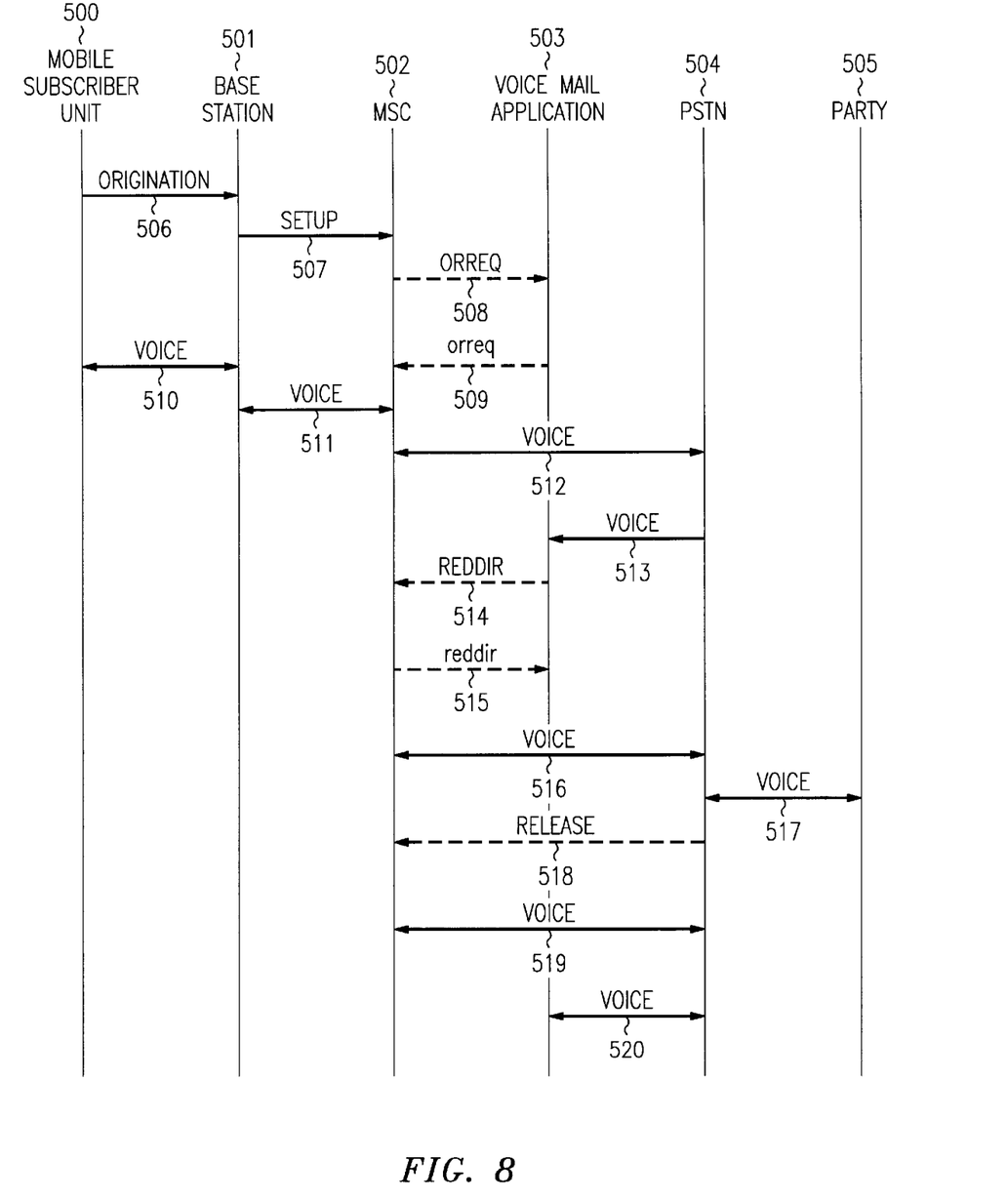
FIG. 8 illustrates a voice mail application utilizing the single redirection approach for a mobile-origination call in a wireless communications system.

FIG. 8 is a call flow diagram illustrating a voice mail service that utilizes the single redirection approach for a mobile-origination call in a wireless communications system. Mobile subscriber unit 500, base station 501, MSC 502, voice mail application 503, PSTN 504, and party 505 correspond to mobile subscriber unit 200, base station 201, MSC 202, adjunct processor 203, PSTN 204, and party 205, respectively. Mobile subscriber unit 500 initiates the mobile-origination call by sending origination message 506 to base station 501.Origination message 501 contains dialed digits of the form "*xy", where "x" and "y" are digits from 0 to 9. The dialed digits signify that a user of mobile subscriber unit 500 wishes to establish a connection to voice mail application 503 in order to retrieve voice messages from previous callers. In response to receiving origination message 506, base station 501 establishes a voice connection between mobile subscriber unit 500 and base station 501 and sends setup message 507 that relays dialed digits "*xy". Also, voice connection 511 is established between base station 501 and MSC 502. MSC 502 translates digits "*xy" and determines that message trigger (ORREQ) 508 must be sent to voice mail application 503. Voice mail application 503 returns response message (orreq) 509 to MSC 502. Message 509 contains a routing telephone number so that MSC 502 can complete voice connections 512 and 513 between MSC 502 and PSTN 504 and between PSTN 504 and voice mail application 503, respectively. Voice connections 510, 511, 512, and 513 constitute the voice path between mobile subscriber unit 500 and voice mail application 503.

A dialog is established between voice mail application 503 and the user of mobile subscriber unit 500. In FIG. 8, it is determined that the user wishes to call back party 505 that left a voice message, which voice mail application 503 has played for the user. Thus, voice mail application 503 sends REDDIR message 514 to MSC 502 to redirect the call to party 505. MSC 502 acknowledges REDDIR message 514 by returning reddir message 515 to voice mail application 503.

MSC 502 processes the Digits parameter (parameter 252 in FIG. 5), and redirects the call accordingly. Subsequently, party 505 releases the call. PSTN 504 notifies MSC 502 about this call event. MSC 502 processes the CallBackFERel parameter (parameter 256 in FIG. 5) as contained in previously received REDDIR message 514. (Similar call flows can be constructed that are contingent upon the detection of other types of call events such as party 505 is busy, party 505 does not answer, and mobile subscriber unit 500 releasing the call.) This parameter contains the designated telephone number of voice mail application 503. Thus, the call is redirected back to voice mail application 503 as a result of party 505 releasing the call. The voice dialog between the user of mobile subscriber unit 500 and voice mail application 503 is resumed if another party has left a voice message. The process as described for FIG. 8 is then repeated as many times as needed to span the entirety of voice messages that have been left for the user of mobile subscriber unit 500.

Figure 9:
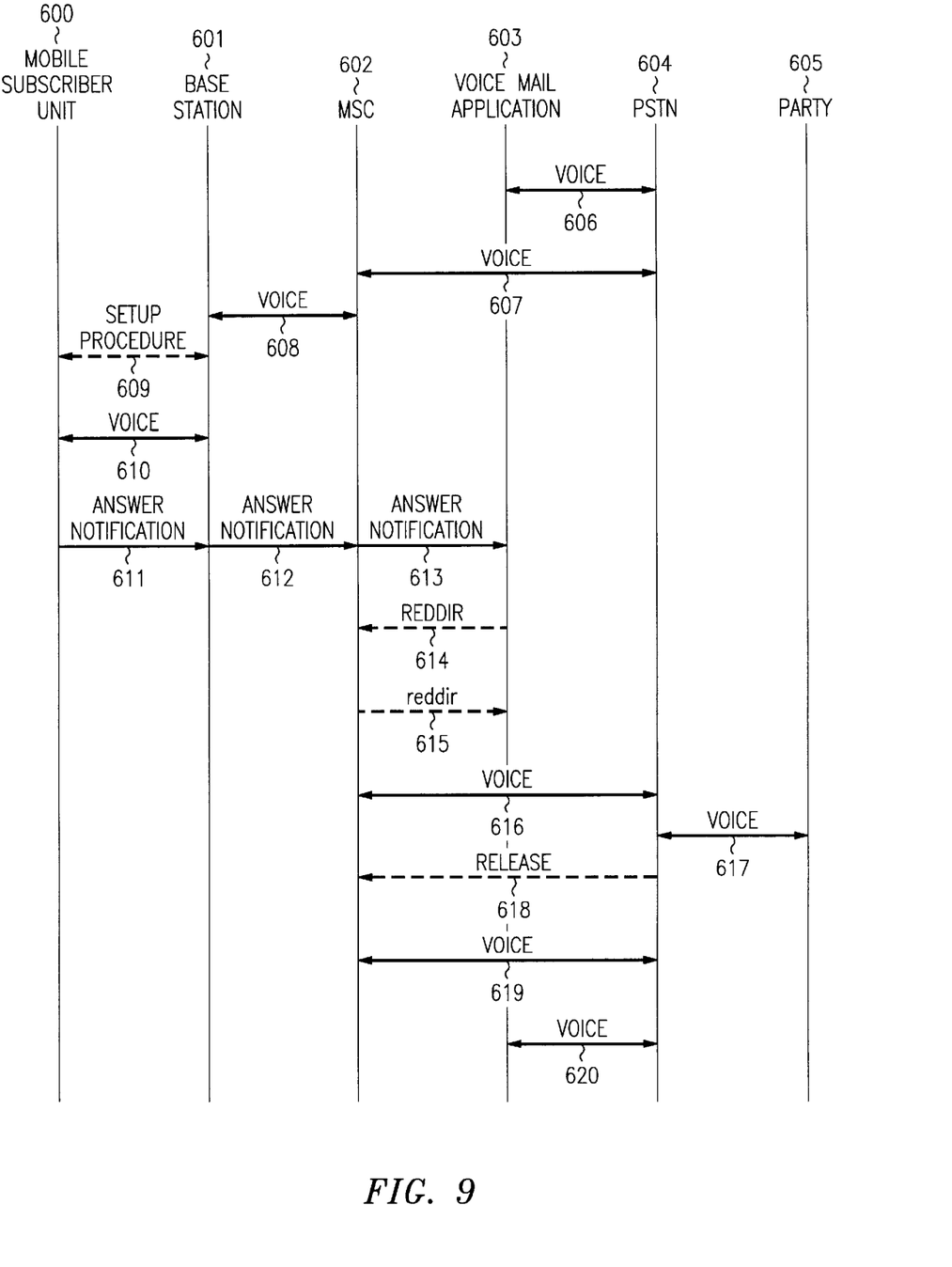
FIG. 9 illustrates a voice message application utilizing the single redirection approach for a mobile-terminated call in a wireless communications system.

FIG. 9 is a call flow diagram showing a voice mail service that utilizes the single-stage redirection approach for a mobile-terminated call in a wireless communications system. Mobile subscriber unit 600, base station 601, MSC 602, voice mail application 603, PSTN 604, and party 605 correspond to mobile subscriber unit 200, base station 201, MSC 202, adjunct processor 203, PSTN 204, and party 205, respectively. Voice mail application 603 initiates the mobile-terminated call to mobile subscriber unit 600 by requesting PSTN 604 to set up the call. (Various events can initiate the mobile-terminated call such as a predetermined time duration expiring since the last access by mobile subscriber unit 600.) Thus, voice connection 606 from voice mail application 603 to PSTN 604 is established in conjunction with sending a telephone number corresponding to mobile subscriber unit 600 either on voice connection 606 or on a separate signaling facility. PSTN 604 routes the call to MSC 602 in which mobile subscriber unit 600 is located. In other variations, mobile subscriber unit 600 may not be located in MSC 602, and thus the call is routed to another MSC in which mobile subscriber unit 600 is located. Such variations are well known in the art.

MSC 602 initiates base station 601 to page and locate mobile subscriber unit 600 utilizing setup procedure 609, which is known in the art. Voice connections 608 and 610 are established, completing a voice path between mobile subscriber unit 600 and voice mail application 603. Voice mail application 603 is notified that mobile subscriber unit 600 has answered the call by answer notification 611 being sent from mobile subscriber unit 600 to base station 601. Consequently, answer notification 612 is relayed from base station 601 to MSC 602, and answer notification 613 is sent from MSC 602 to voice mail application 603. A dialog is established between voice mail application 603 and a user of mobile subscriber unit 600. Voice mail application 603 determines that the user wishes to call back party 605 that has left a voice message. The remainder of the call flow in FIG. 9 is analogous to the call flow in FIG. 8. Voice mail application 603 sends REDDIR message 614 to MSC 602 to redirect the call to party 605. MSC 602 acknowledges REDDIR message 614 by returning reddir message 615 to voice mail application 603. MSC 602 processes the Digits parameter (parameter 252 in FIG. 5) and redirects the call accordingly. Subsequently, party 605 releases the call. PSTN 604 notifies MSC 602 about this call event. MSC 602 processes CallBackFERel parameter (parameter 258 in FIG. 5) as contained in previously received REDDIR message 614. The CallBackFERel parameter contains the designated telephone number of voice mail application 603. Thus, the call is redirected back to voice mail application 603 as a result of party 605 releasing the call. The dialog between the user of mobile subscriber unit 600 and voice mail application 603 is resumed if another party has left a voice message. The process is repeated as many times as needed to span the entirety of voice messages that have been deposited for the user of mobile subscriber unit 600. It is to be understood that the above-described embodiment is merely an illustrative principle of the invention and that many variations may be devised by those skilled in the art without departing from the scope of the invention. It is, therefore, intended that such variations be included with the scope of the claims.

What is claimed:

1. A telephone communications system, said communications system supporting a call with a telephone unit, said telephone communications system including an adjunct processor connected to a telephone switching center, said telephone communications system comprising:

means for said adjunct processor to instruct said telephone switching center to conditionally redirect said call if one of a plurality of call event types subsequently occurs, each call event type associated with a designated telephone number;

means, responsive to said instructing means, for detecting a subsequent occurrence of one of said plurality of call event types at said telephone switching center; and means, responsive to said detecting means, for redirecting said call to said designated telephone number over said telephone switching center.

2. The telephone communications system of claim 1, wherein said telephone unit comprises a mobile subscriber unit, wherein said telephone communications system is a wireless communications system, wherein said telephone switching center is a mobile switching center, and wherein said mobile subscriber unit is located within a region served by said mobile switching center.

3. The telephone communications system of claim 2, wherein said plurality of call event types is selected from the group consisting of busy, no answer, far-end-release, and mobile release.

4. The telephone communications system of claim 2, wherein said redirecting means utilizes a default designated telephone number if said designated telephone number associated with one of said plurality of call event types is not contained in said instructing means.

5. The telephone communications system of claim 2, wherein said instructing means is compatible with an ANSI-41 RedirectionDirective message.

6. The telephone communications system of claim 2, wherein said instructing means utilizes an TIA PN-4287 CallControlDirective message.

7. The telephone communications system of claim 2, wherein said call is a mobile-originated call.

8. The telephone communications system of claim 2, wherein said call is a mobile-terminated call.

9. The telephone communications system of claim 2, wherein said instructing means further comprises:

unconditionally redirecting said call to a initial redirection telephone number preceding conditionally redirecting said call.

10. The telephone communications system of claim 3, wherein said adjunct processor supports voice mail services, wherein said designated telephone number corresponds to the adjunct processor, and wherein said initial redirection telephone number corresponds to a party leaving a voice mail entry.

11. The telephone communications system of claim 10, wherein said call is a mobile-originated call.

12. The telephone communications system of claim 10, wherein said call is a mobile-terminated call.

13. A method for supporting a call with a mobile subscriber unit in conjunction with an adjunct processor for use in a wireless communications system, said adjunct processor connected to a mobile switching center, said mobile subscriber unit located within a region served by said mobile switching center, said method comprising the steps of:

instructing said mobile switching center to conditionally redirect said call by said adjunct processor if one of a plurality of call event types subsequently occurs, each call event type associated with a designated telephone number;

detecting a subsequent occurrence of one of said plurality of call event types by said mobile switching center, responsive to said step of instructing; and redirecting conditionally said call to said designated telephone number, responsive to said step of detecting, by said mobile switching center.

14. The method of claim 13, wherein said step of instructing means further comprises:

redirecting unconditionally said call to a initial redirection telephone number preceding conditionally redirecting said call.

15. The method of claim 13, wherein said plurality of call event types is selected from the group consisting of busy, no answer, far-end-release, and mobile release.

16. The method of claim 13, wherein said step of redirecting utilizes a default designated telephone number if said designated telephone number associated with one of said plurality of call event types is not contained in said step of instructing.

17. The method of claim 13, wherein said step of instructing is encoded with an ANSI-41 RedirectionDirective message.

18. The method of claim 13, wherein said step of instructing is encoded with an TIA PN-4287 CallControlDirective message.

19. A method for supporting a voice mail service with a mobile subscriber unit and a party leaving a voice mail entry in conjunction with an adjunct processor for use in a wireless communications system, said adjunct processor connected to a mobile switching center and associated with a designated telephone number, said party associated with an initial redirection telephone number, said mobile subscriber unit located within a region served by said mobile switching center, said method comprising the steps of:

instructing said mobile switching center to conditionally redirect a call by said adjunct processor if one of a plurality of call event types subsequently occurs, each call event type associated with said designated telephone number;

redirecting unconditionally said call to said initial redirection telephone number, preceding conditionally redirecting said call and responsive to said step of instructing;

detecting a subsequent occurrence of one of said plurality of call event types by said mobile switching center, responsive to said step of instructing; and redirecting conditionally said call to said designated telephone number, responsive to said step of detecting, by said mobile switching center.

* * * * *